US009795090B2

(12) United States Patent
Nilsson et al.

(10) Patent No.: US 9,795,090 B2
(45) Date of Patent: Oct. 24, 2017

(54) PLUGGTRAINER

(71) Applicant: Nelson Garden AB, Tingsryd (SE)

(72) Inventors: Torsten Nilsson, Tingsryd (SE); Ulf Fransson, Tingsryd (SE)

(73) Assignee: Nelson Garden AB, Tingsryd (SE)

( * ) Notice: Subject to any disclaimer, the term of this patent is extended or adjusted under 35 U.S.C. 154(b) by 113 days.

(21) Appl. No.: 14/280,394

(22) Filed: May 16, 2014

(65) Prior Publication Data

US 2014/0338259 A1    Nov. 20, 2014

(30) Foreign Application Priority Data

May 16, 2013  (EP) .................................... 13168041

(51) Int. Cl.
*A01G 9/10* (2006.01)
*A01G 27/04* (2006.01)
(Continued)

(52) U.S. Cl.
CPC ............ *A01G 9/1026* (2013.01); *A01G 9/028* (2013.01); *A01G 9/104* (2013.01); *A01G 9/16* (2013.01);
(Continued)

(58) Field of Classification Search
CPC .... A01G 5/00; A01G 2009/003; A01G 9/026; A01G 9/027; A01G 9/028; A01G 27/04; A01G 27/06; A01G 31/06
(Continued)

(56) References Cited

U.S. PATENT DOCUMENTS 3,386,607 A * 6/1968 Keene .................... B65D 1/225
                                                206/140
3,447,261 A * 6/1969 Hundt .................... A01G 9/104
                                                229/120.07

(Continued)

FOREIGN PATENT DOCUMENTS

DE          3507563 A1 * 9/1986  .......... E04D 11/002
GB          2334420 A      8/1999
WO      2006/106243 A1    10/2006

OTHER PUBLICATIONS

European Search Report received for EP Patent Application No. 13168041.5, mailed on Oct. 16, 2013, 7 pages.
(Continued)

*Primary Examiner* — Son T Nguyen
(74) *Attorney, Agent, or Firm* — Morrison & Foerster LLP

(57) ABSTRACT

The present invention relates to a container for propagating growth of seedlings, having a main body comprising a base, a central wall extending vertically from the base. A first wall section and a second wall section are arranged to the main body. The first wall section and the second wall section are hingeably connected to the main body. The base, the central wall, the wall sections forms in the closed condition at least two cells being open at top. The base comprises a supporting structure at the lower part of the main body, wherein the main body is provided with supporting means for holding an irrigation mat. The present invention also relates to a tray designed for receive and carry one or more of said containers, a greenhouse including the tray and one or more of the mentioned containers, and a method for propagating growth of seedlings.

12 Claims, 8 Drawing Sheets

(51) Int. Cl.
*A01G 9/02* (2006.01)
*A01G 9/16* (2006.01)
*A01G 9/00* (2006.01)

(52) U.S. Cl.
CPC ........ *A01G 27/04* (2013.01); *A01G 2009/003* (2013.01)

(58) Field of Classification Search
USPC ........ 47/60, 66.3, 66.1, 66.5, 73, 81, 84, 85, 47/86, 87, 41.01
See application file for complete search history.

(56) References Cited

U.S. PATENT DOCUMENTS

| | | | |
|---|---|---|---|
| 3,751,852 A | 8/1973 | Schrepper | |
| 3,807,622 A * | 4/1974 | Belcher | B65D 81/133 206/418 |
| 3,868,054 A * | 2/1975 | Congleton | A01G 9/104 206/423 |
| 3,986,299 A * | 10/1976 | Merzweiler | A01G 9/104 206/423 |
| 4,006,558 A * | 2/1977 | Neddo | A01G 9/104 206/423 |
| RE29,248 E * | 6/1977 | Congleton | B65D 85/52 206/423 |
| 4,057,932 A * | 11/1977 | Spencer | A01G 9/104 206/423 |
| 4,224,765 A | 9/1980 | Song | |
| 4,299,054 A | 11/1981 | Ware | |
| 4,998,378 A | 3/1991 | Spencer | |
| 6,050,027 A * | 4/2000 | Pavelka | A01G 9/104 206/423 |
| D624,846 S * | 10/2010 | Schick | D11/156 |
| 2008/0276530 A1 | 11/2008 | Trabka | |

OTHER PUBLICATIONS

Office Action received for European Patent Application No. 13168041.5 mailed on Jan. 27, 2016, 6 pages.
Decision to Grant received for European Patent Application No. 13168041.5, mailed on Feb. 9, 2017, 2 pages.
Intention to Grant received for European Patent Application No. 13168041.5, mailed on Oct. 4, 2016, 6 pages.

* cited by examiner

PLUGGTRAINER

REFERENCE TO RELATED APPLICATIONS

This application claims priority from European Patent Application No. 13168041.5, filed on May 16, 2013, the content of which is incorporated herein by reference in its entirety.

FIELD OF THE INVENTION

The present invention relates to a container for propagating growth of seedlings. The present invention also relates to a tray designed for receive and carry one or more of said containers, a greenhouse including the tray and one or more of the mentioned containers, and a method for propagating growth of seedlings.

BACKGROUND OF THE INVENTION

A variety of pots, trays and greenhouses that are used for promoting growth of a seed to a plant are commonly known in the art. According to a usual method, a container is used for planting and cultivating a seed to a plant. As soon as the plant has strike root and grown to a sufficient size, the plant is transplanted to a chosen location. It is then important, when carrying out the transplanting, to remove the plant along with its root structure together with the potting soil from the container. Failure could damage the roots. Also attempts to separate the root structure from the soil are likely to harm the roots. Each plant with its roots should be cultivated individually such that the root systems of any adjacent plants not are entangled with one another. Moreover, it is also important to produce a good root structure, where among other things a thick growth of the roots are promoted as well as vertical/downward extending straight roots are developed.

Over the years, many different kind of arrangements and systems for promoting growth of a seed to a plant have been put on the market. Through the patent document U.S. Pat. No. 4,998,378, a book-type container for raising seedlings is formerly known. From an ease of handling point of view and for practical reasons, the container disclosed in U.S. Pat. No. 4,998,378 is designed like a book/folder, where the folder sides are opened in order to remove a grown plant with its potted soil for transplanting. One problem of such a book-like design is that the handling of the container is rather complicated when preparing the container with soil and seeds, as well as when the plants and the potted soil are to be removed from the container for transplanting. The container necessitates a retainer as supporting structure in which the container can be upheld. The container is not suited to stand alone and can easily tip over. Consequently, plants and roots may easily be damaged during the handling of the container. Thus, the container is not secure, and the plants with the potted soil may fall apart if not handled with care. Another problem is that the container is not suitable for use in an irrigation system such as a greenhouse arrangement, and measures for providing watering and ventilation conditions are lacking. The watering is intended to be added at the open top of the container.

The objective of the present invention is to provide a container and a method for promoting growth of a seed to a plant, eliminating the disadvantages associated with prior art. A further objective is to achieve an improved container for promoting growth of a seed to a plant, that is secure, easy to handle and efficient in use. It is further an object to accomplish a container that could easily and quickly be brought into engagement/interaction with a tray, such in a greenhouse arrangement, and also in a simple manner be removed from there, while at the same time providing perfect watering and ventilation conditions for promoting ideal growth.

SUMMARY OF THE INVENTION

The above objectives are solved by the present invention which relates to a container for propagating growth of seedlings. The container is characterised by a main body comprising a base, a central wall extending vertically from the base. A first wall section and a second wall section are arranged to the main body. Respectively wall section is arranged alongside and spaced apart from each long side of the central wall of the main body. The main body has two opposing end walls at the respective short sides. The wall sections are provided with transverse wall segments, where the first wall section and the second wall section are hingeably connected to the main body for movement between a closed condition in engagement with the central wall and an opened condition disengaged from the central wall. The base, the central wall, the wall sections and segments forms in the closed condition at least two cells being open at top. The bottom of each cell is provided with an opening. Further, the base comprises a supporting structure at the lower part of the main body. The main body is provided with supporting means for holding an irrigation mat.

In accordance with the solution of the present invention, an efficient and stable/rigid container that stands alone is achieved. One or more containers can be handled simultaneously in a secure way at the same time, without necessitating a supporting retainer while preparing the containers with seeds and soil, or when removing plants with roots and soil for transplanting. Thus, this easy handling also includes the situation where the containers are partly or completely opened. At the same time, the container efficiently allows for cultivation of a large number of plants in one separate container unit. The configuration of the container with cells divided in two rows, one on each side of a central partition wall, where each wall section is connected in a hinge, facilitates the removal of the plants when ready for transplanting or to be planted directly in the soil or a pot for further growth. Another advantage is that the container is adapted for a tray, preferably included in a greenhouse arrangement, in which the container, the tray and the greenhouse facilitates for excellent irrigation and ventilation condition of the plants and roots.

For facilitating more efficient and superior watering conditions, the irrigation mat is suitably arranged at the base of the main body, preferably with one or both ends ending on the outside of the container. Preferably, one or more engaging arms can be arranged to at least one long side of the central wall to hold the irrigation mat in position at a lower portion of the main body towards the base. Each of the end walls may have an aperture through which the irrigation mat runs. By the combination of the container and the irrigation mat arranged outwardly on one or both end side walls of the container, an irrigation system can be provided that fulfils the necessary conditions for the required degree of watering.

According to an embodiment, the wall sections can be tapering, preferably continuously, towards the base. The tapering promotes the dewatering in the cells and favours the growth of the roots towards the hole in the bottom. The first wall section and the second wall section are suitably hingeably connected to the main body by hinge means (i.e., a hinge). The wall sections forming the cells are preferably corrugated, on the inside surfaces, which makes it easier for straight propagation of the roots and avoids entangling.

According to an embodiment, the first wall section and the second wall section can be hingeably connected to the main body by hinge means. The hinge means suitably comprises a pin on each side of the lower part of the first wall section and the second wall section. The hinge means may further comprise through openings at the adjacent sides of the end walls for engagement of each of the pins in mating openings. The through openings at the adjacent sides of the end walls can have an oblong shape, which openings may have a longer diameter in the vertical direction than in the horizontal direction.

Further, the container can be provided with locking members for secure engagement with the main body in closed condition. The locking members suitably comprises a male-female connection between the central wall and each of the first wall section and the second wall section.

According to additional embodiments, the present invention relates to a tray for plants. The tray comprises long sides, short sides, and a bottom. The upper side of the tray being open. The tray is designed for receive and carry one or more containers to the invention and as described above. The tray can further be provided with: brackets arranged adjacent the bottom, intended for support of the supporting structure of the containers at a distance from the bottom surface.

Additionally, the present invention relates to a greenhouse for propagating growth of seedlings. The greenhouse comprises the tray and one or more containers according to the invention and as described above. Further, the greenhouse comprises a transparent cover that is arranged on top of the tray.

Further, the present invention relates to a method for propagating growth of seedlings. The method comprises the following steps: filling soil and placing seeds in cells in one or more containers according to the invention as mentioned above; providing the containers with an irrigation mat; placing the container or the containers in the tray according to the invention as mentioned above on brackets such that the irrigation mat or mats are positioned adjacent and towards the bottom surface of the tray; adding water into the tray; and arranging a transparent cover on top of the tray.

Other objectives, embodiments and advantages of the present invention are described in closer detail in the description and in the subsequent patent claims.

BRIEF DESCRIPTION OF THE DRAWINGS

The invention will hereinafter be described with reference to embodiments of the present invention and the accompanying drawings, in which FIG. 1A schematically shows the container in a perspective side view in accordance with one embodiment of the present invention, FIG. 1B illustrate the container in FIG. 1A, in an open condition, in accordance with one embodiment of the present invention, FIG. 2A illustrate in a perspective view obliquely from above a tray according to an embodiment of the present invention and a container as shown in FIGS. 1A-B in a position ready for engagement into the tray or removal from the tray, FIG. 2B illustrate the tray in FIG. 2A in a cross sectional view from the side, during engagement or removal of several containers into or from the tray, FIG. 2C illustrate the tray in FIGS. 2A-B in a cross sectional view from the side, comprising a full set of containers in the tray.

DETAILED DESCRIPTION OF THE INVENTION

Figure 1A:
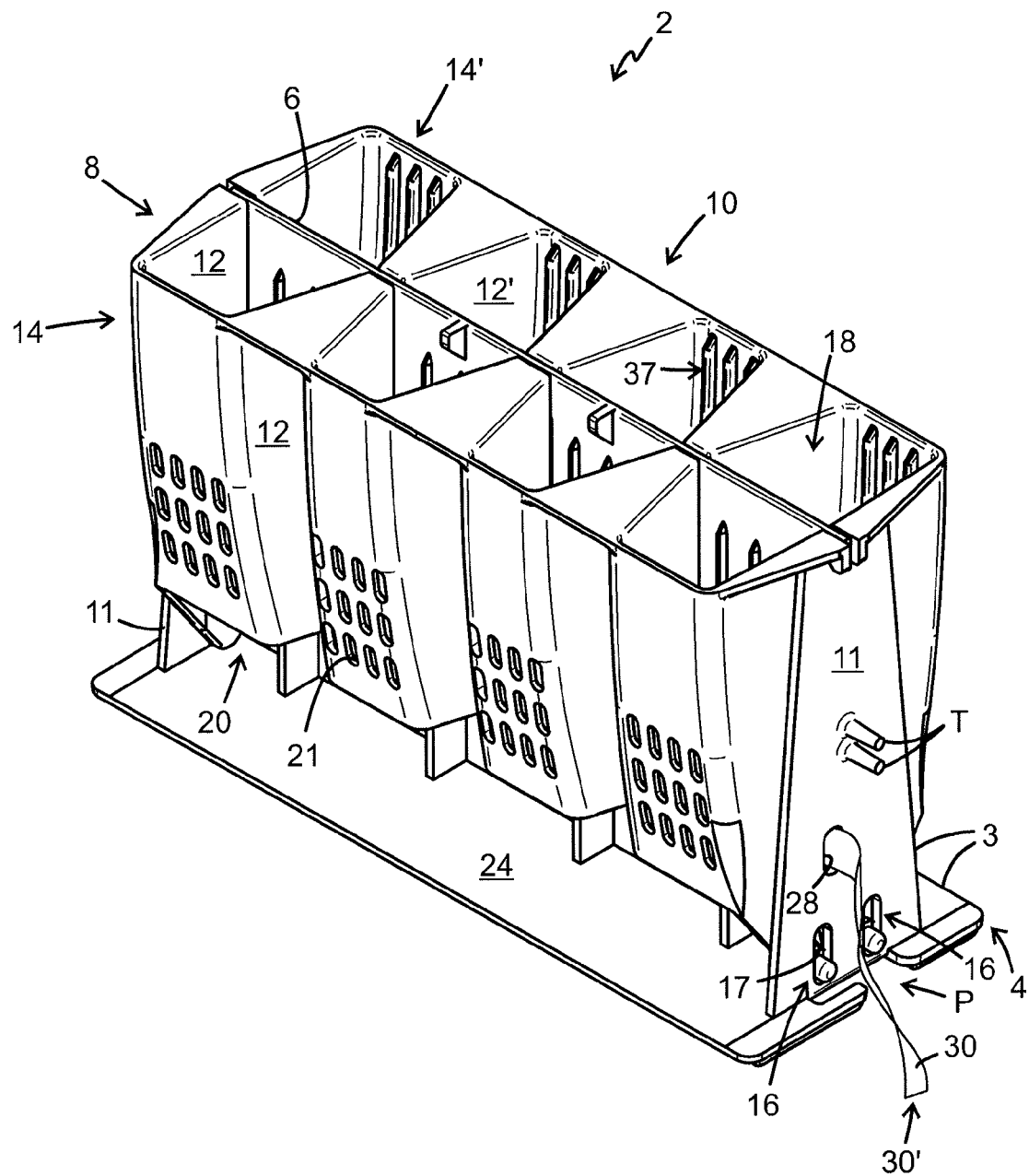
Figure 1B:
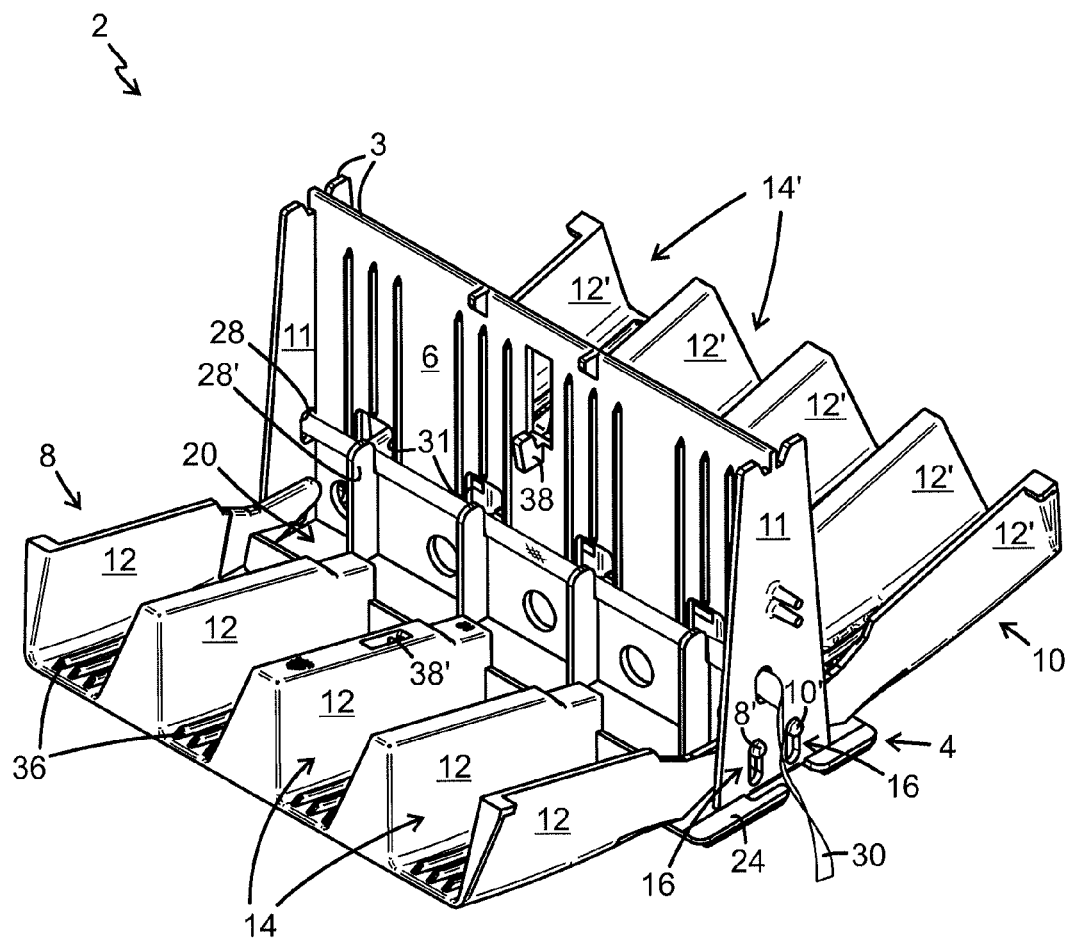

FIG. 1A-B, shows a container 2 for propagating growth of seedlings S (see FIG. 2F) in accordance with one embodiment of the present invention, having a main body 3 comprising a base 4 and a central wall 6 extending vertically from the base 4. The container further comprises a first wall section 8 and a second wall section 10 arranged to the main body 3. The respective wall section 8, 10 is arranged alongside and spaced apart from each side of the central wall 6 of the main body 3. The main body 3 can be produced, for example by injection moulding in one piece, while the respective wall sections 8, 10 can be manufactured and provided separately, for example by injection moulding in one piece. Subsequently, the first wall section 8 and the second wall section 10 are mounted, preferably in a detachably way, to the main body 3 of the container 2. The main body 3 has two opposing end walls 11 at the respective short sides. The respective wall sections 8, 10 are provided with transverse wall segments, first segments 12 and second segments 12', respectively. The central wall 6, the first wall section 8 and the wall segment 12, forms in the closed condition a number of cells 14 that are open at their top 18. Similarly, the central wall 6, the second wall section 10 and wall segment 12' forms in the closed condition an additional number of cells 14', open at their top 18, on the opposed side of the central wall 6. Thus, the cells 14, 14' are divided in two rows, one on each side of the central partition wall 6. The first wall section 8 and the second wall section 10 are hingeably connected to the main body 3 by hinge means 16. The end walls 11 may be provided with a through opening 17, preferably an oblong opening, as described further below. The respective wall sections 8, 10 may be provided with a protruding tap 8', 10' on each lower outer end of the wall sections. Each tap fits in the respective opening 17 in the end walls 11, forming a hinge. Each wall section 8, 10 may independently be pivoted between a closed condition in engagement with the central wall 6 and an opened condition disengaged from the central wall 6. In order to keep the wall sections 8, 10 in the closed position, the transverse wall segments 12, 12' can be provided with locking members 38, 38'. The locking members can be designed as a male and female connection. According to an embodiment, the male and female connection of the locking members may be a hook 38 and a slot 38'. It is also possible, in a suitable embodiment that the wall segments 12, 12' are adapted to lock each other when in engagement with one another. According to another embodiment, at least the transverse wall segments 12, 12' on the short sides of the container is provided with locking members for secure engagement with the central wall 6 in closed condition.

Figure 2A:
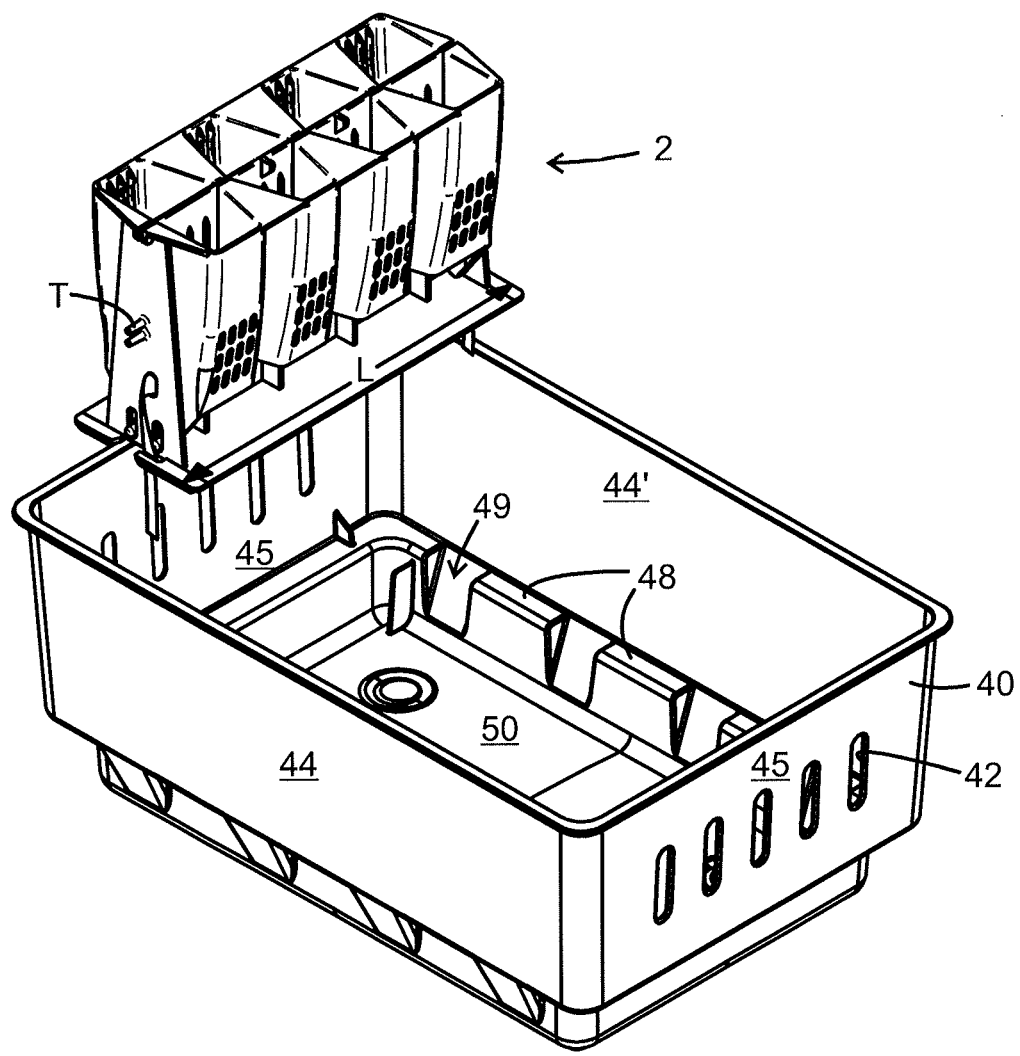
FIG. 2D shows in a perspective view obliquely from above the tray according to FIGS. 2A-C.
FIG. 2E shows a greenhouse, in a none cross-sectional view from the side. in an embodiment according to the invention, for the tray and the containers according to FIGS. 1A-B and 2A-D.
FIG. 2F shows in a cross-sectional side view the greenhouse in FIG. 2E.
Figure 2B:
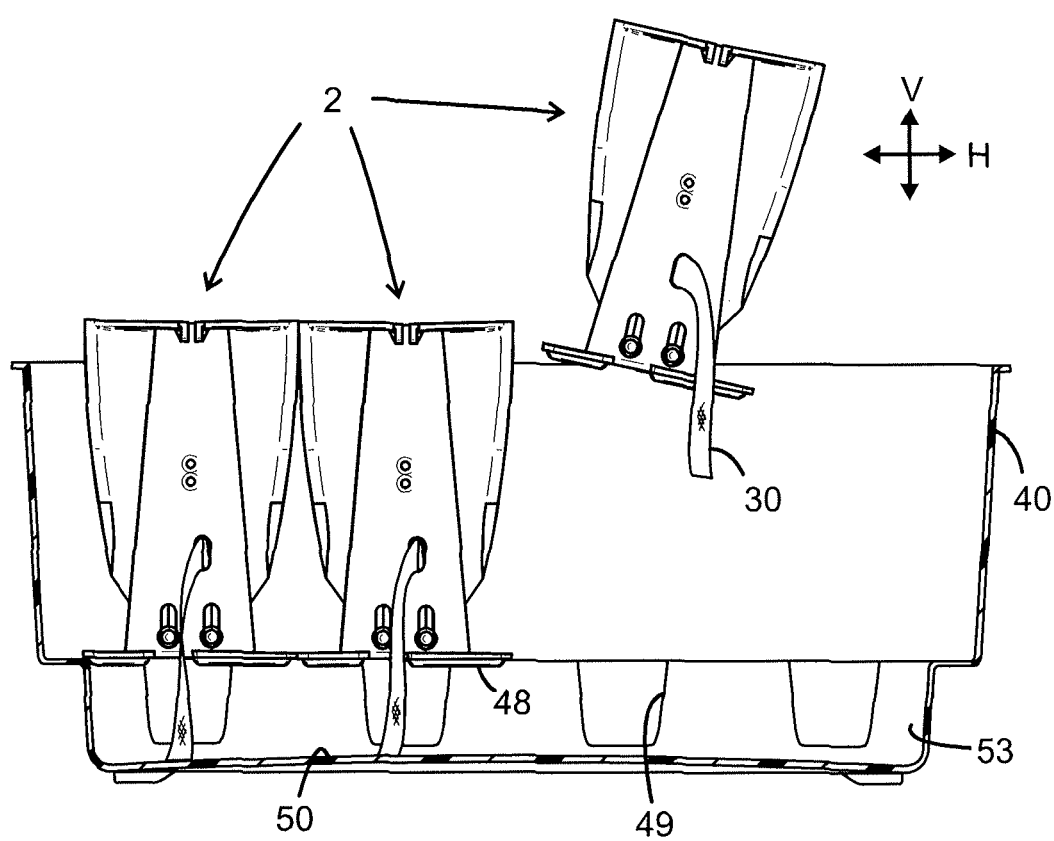

Preferably, the openings 17, suitably oblong openings, in the end walls 11 have a longer diameter in the vertical direction V than in the horizontal direction H (see FIG. 2B).

Further, in the state where the respective first and second wall section 8, 10 are in engagement adjacent the central wall 6 of the main body 3, the respective tap 8', 10' is positioned at the lowest point in the preferred oblong opening 17. As a result, the hinge 16 formed by the taps 8', 10' inserted in the oblong openings 17 can cooperate with the suitable male and female locking members 38, 38', such as a hook 38 and a slot 38', such that the respective first and second wall section 8, 10 can be released from the engagement adjacent the main body 3 by lifting the respective first and second wall section 8, 10 in a upward vertical direction V. This is possible due to that the taps 8', 10' are free to move upwards in the oblong openings 17 towards the uppermost point in the oblong openings. When the respective first and second wall section 8, 10 has been lifted and released from the engagement adjacent the main body 3, the respective first and second wall section 8, 10 can be completely folded out and away from the central wall 6 in a disengaged position as shown in FIG. 1B.

According to the embodiment described and shown with reference to inter alia FIG. 1A-B, the container 2 comprise four cells 14, 14' on each side of the central wall 6, i.e. a total of eight cells 14, 14'. Of course, the number of cells can be varied to a large extent. Preferably, the number of cells is at least two, more preferred the number of cells are in the range 4-12. However, the container 2 always has one or more cells 14, 14' on each side of the central wall 6.

Each cell 14, 14' adjacent the base 4 is preferably provided with a bottom hole 20. Each cell may also be provided with ventilation holes 21, provided in portions of the wall sections 8, 10 that defines each cell. The ventilation holes 21 can be provided in order to let in air to the soil in each cell, and also in order to let out roots and promote the growth of roots. Additionally, the wall sections 8, 10, and suitably also the transverse wall segments 12, 12', are preferably corrugated 36, at least on the inside surfaces 37 of the cells. The corrugations 36 are made in a similar way as described in the patent document U.S. Pat. No. 4,998,378. The corrugation slots 36 on the inside surface 37 of the cells make it easier for the roots to grow in a direction straight towards the bottom of the cells and also decrease the risk for root tangling.

The base 4 of the container comprises a support structure 24 at the lower part of the main body 3. The support structure 24 can be a flat sheet having a flat bottom surface and an extension corresponding roughly to the total upper area of the cells 14, 14' at the top of the container. The flat sheet of the supporting structure 24 provides a stable support of the container on a surface when the container 2 is handled outside the tray of a greenhouse as described further below. Preferably, the support structure, such as the suitable flat sheet, can be provided with feets on the rear side facing the ground.

According to a preferred embodiment, the wall sections 8, 10 are tapering, preferably continuously, towards the base 4, which promotes the dewatering in the cells and favours the growth of the roots towards the hole 20 in the bottom. With respect to the tapering of the wall sections, the wall sections can be provided as a continuously curve surface from the top 18 of the container to the base 4.

FIG. 1A-B shows an irrigation mat 30 intended for insertion in the container 2, in accordance with one embodiment of the present invention. The irrigation mat 30 can be in a form of an elongated ribbon, strip or the similar shape, such that it is suitable to be adapted in engagement with the container 2 in FIGS. 1A-B. Further, the main body 3 is provided with supporting means 28, 28' for holding the irrigation mat 30. The supporting means may comprise of one or more engaging arms 28' that can be arranged at least along one long side of the central wall 6 to hold the irrigation mat 30 in position at a lower portion of the main body 3 towards the base 4. Further, each end wall has preferably a through aperture 28 through which the irrigation mat 30 is intended to run through, suitably on each side, of the end wall 11 container. The irrigation mat 30 is easy to insert respectively remove from the supporting means 28, 28' since it is only loosely and detachably inserted in engagement with the supporting means 28, 28'. As evident from FIGS. 1A-B and 2A-C, the irrigation mat 30 is extending out at a distance away from the end walls 11 at the short sides which is further explained with reference to FIGS. 2A-C below.

Suitably, the irrigation mat 30 is made longer than the longitudinal length L of the container, preferably at least about 50 mm longer than the container length L, such that a free end 30' at least extends out from the container at least on one of the short sides from the aperture 28 when the irrigation mat 30 is fully inserted in the container. When placed in the correct position in the container and through the aperture(s) 28, the irrigation mat 30 is able to provide sufficient water through capillary force to the soil volume in all cells 14, 14', even if the irrigation mat 30 is only arranged on one side of the central wall 6 as illustrated in FIG. 1B, due to suitable communication holes 31 in the central wall 6, serving as water connection between the cells 14, 14' on each side of the central wall, at the position of the irrigation mat in the central wall 6.

The supporting structure 24 may have a recess P on one or both short sides of the container, preferably provided in the supporting structure 24, for position of the irrigation mat on the outside of the container. Further, each end wall 11 is preferably provided with one or more protruding pin(s) T which serves as suspension attachments for the irrigation mat, when not in use for absorbing water from the bottom of the tray, and/or distance elements, in order to keep each container in its correct position towards each wall when placed in the tray towards each wall, further explained below.

Figure 2C:
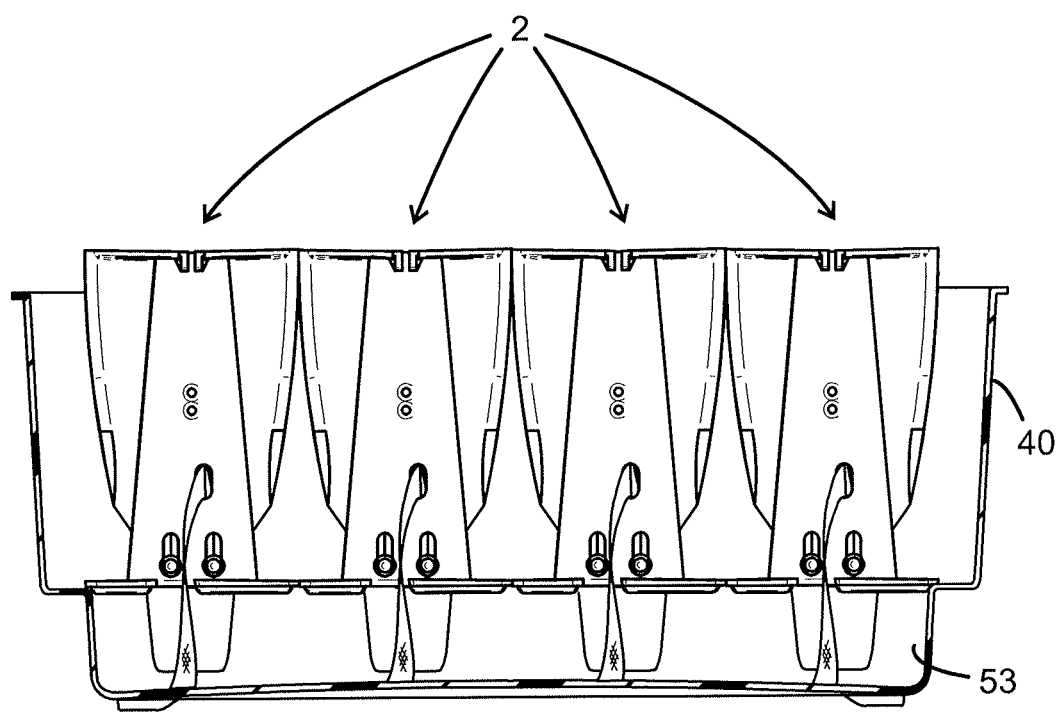

FIG. 2A-C shows a tray 40 for plants according to an embodiment of the present invention. The tray 40 comprises long sides 44, 44', short sides 45, and a bottom 50. The top of the tray is open but can be covered by a separate lid to form a greenhouse as explained further below. The illustrated tray 40 is designed for receive and carry up to four containers 2 as shown and described above with reference to FIGS. 1A and 1B. As evident from FIG. 2A, a container 2 is illustrated in the closed position (according to FIG. 1A) in a position ready for engagement into, or removal from, the tray 40. Containers 2 are also shown in FIGS. 2B-C that are arranged in their intended rest positions in the tray 40. However, although the embodiments and the FIGS. 2A-D shows a tray 40 accommodating up to four containers 2, the tray 40 can be designed for any number of containers 2.

Further, the tray 40 is provided with ventilation holes 42, at least at the short sides 45 and/or at the long sides 44, 44'. Suitably, the ventilation holes 42 are arranged closer to the upper edge of the tray than to the bottom. In the tray there are brackets 48 close to the bottom 50 of the tray 40 for support of the container at a distance from the bottom 50. One or more protruding pin(s) T can be arranged on each end wall 11 of the containers 2 which pins serves as distance elements, in order to keep each container in its correct position towards each long side 44, 44' when placed in the tray. Recesses are formed between the brackets 48, in order to create gaps 49 between the support structure 4 of each container and the brackets 48 at the bottom of the tray. In the gaps 49 the irrigation mat 30 from each container can extend down into the bottom surface 50 of the tray. A space 53 for holding water is created between the bottom surface 50 of the tray and the support structure 4 of each container. However, in the broadest sense of the scope of the invention, other means (not shown) than the mentioned brackets 48, can be provided in order to arrange the container in the intended way for fixing the distances between the support structure 4 of the container and the tray, which other means are evident for the person skilled in the art. The gaps 49 makes access to the space 53 (see FIG. 2B-C) created below the support structure 4, such that each irrigation mat running down into the bottom can take up water from the space. With other words, the free end 30' of an irrigation mat 30 of each container 2, when placed in the tray 40, extends down into the space 53 via the gap 49 and in contact with the water in the space 53 in order to bring water to the cells by capillary force.

Figure 2D:
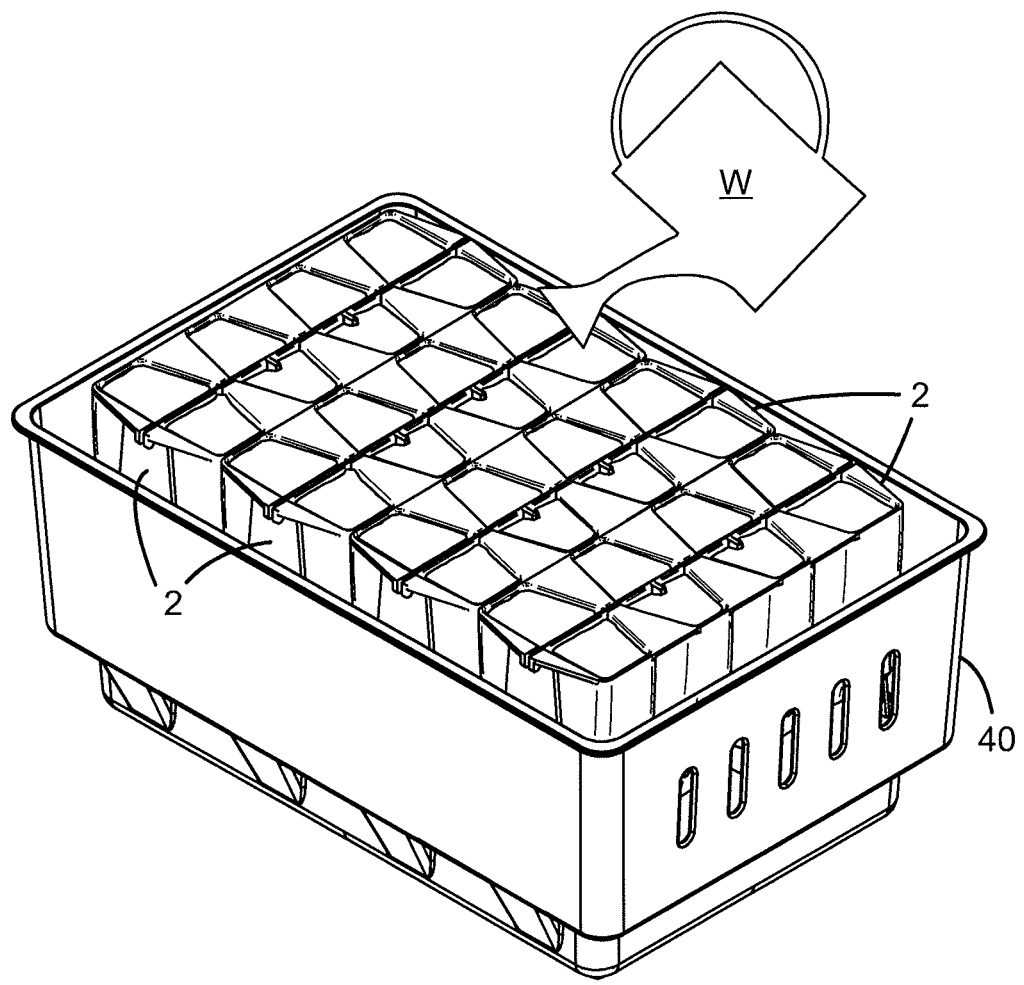
Figure 2E:
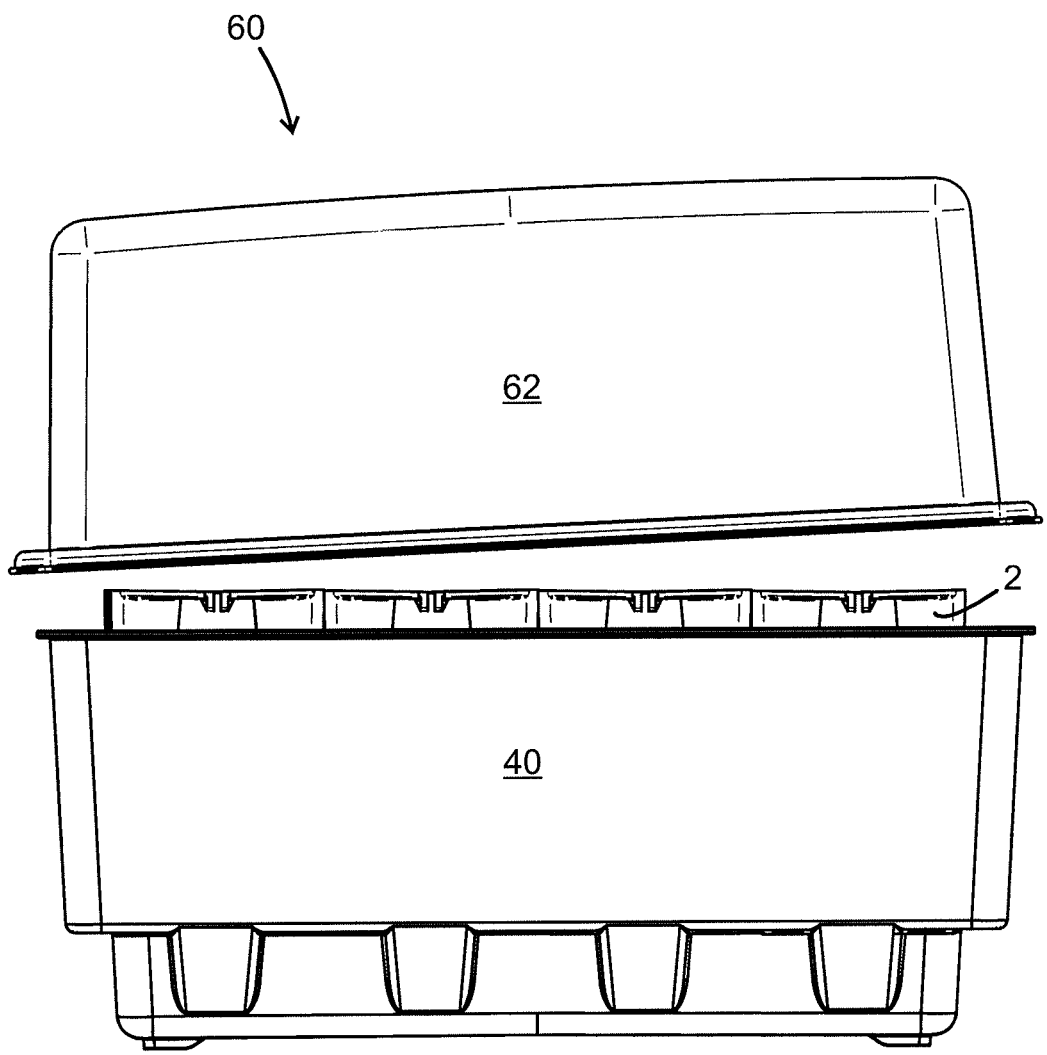
Figure 2F:
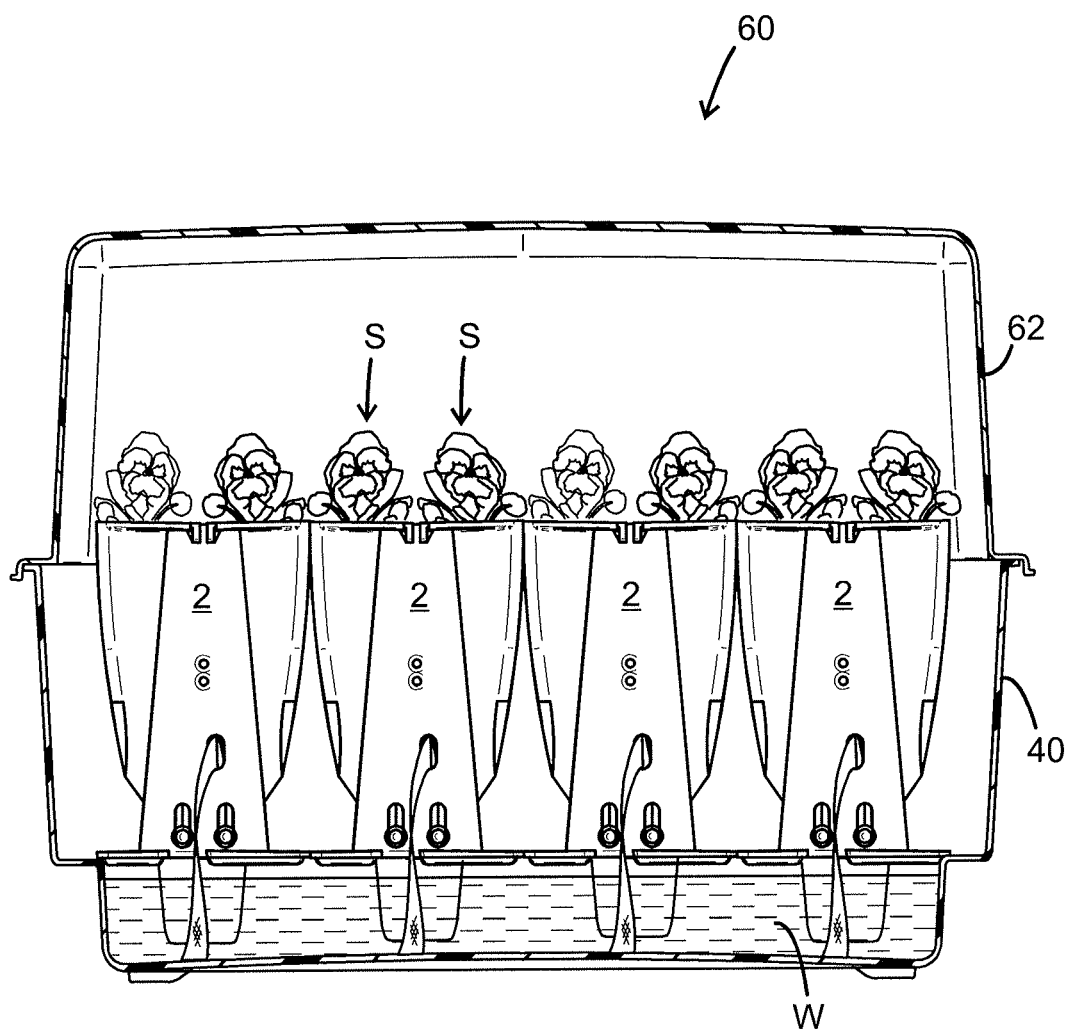

FIG. 2E-F shows an embodiment of a greenhouse 60 according to the invention, for the tray 40 and the containers according to FIGS. 1A-B and 2A-D. Up to four containers, as shown and described above with reference to FIGS. 1 and 2, can be arranged in the greenhouse, although the tray can be designed for any number of containers. The greenhouse 60 also comprises a transparent cover 62 that is arranged on top of the tray 40. The cover 62 can be provided with ventilation holes (not shown), in order to provide a sufficient ventilation of the interior of the greenhouse. For the purpose of making a package in a compact way for sale, distribution and transportation, as mentioned above with respect to the containers when placed in the tray 40, the main bodies 3 are separated from the first and second wall sections 8, 10 and the separated parts are all placed into the tray, and the cover 62 is placed upside down under and around the tray 40.

When using the container 2, the tray 40 and the greenhouse 60 for propagating growth of seedlings S, following steps (see FIGS. 2A-F) are taken in optional order (except for placing a cover on the tray) according to the method of the present invention. Soil is filled in the cells and seeds are placed in the soil in the cells 14, 14' in one or more containers 2, as mentioned above according to the invention. Water from a watering can W can be added into the tray with one or more of the containers 2 removed from the tray, or added on the top of the containers when positioned in the tray as shown in FIG. 2D. The container 2 or the containers are placed in the tray 40 on the supporting brackets 48 such that the irrigation mat or mats 30 are positioned through the gaps 49 towards the bottom surface 50. A transparent cover 62 is arranged on top of the tray 40.

The invention claimed is:

1. A container for propagating growth of seedlings, comprising:

a main body comprising a base, and a central wall extending vertically from the base, and a first wall section and a second wall section that are arranged to the main body, wherein the first wall section and the second wall section are arranged alongside and spaced apart from respective long sides of the central wall of the main body, the main body has two opposing end walls at respective short sides, the first and second wall sections are provided with transverse wall segments, the first wall section and the second wall section are hingeably connected to the main body for movement between a closed condition in engagement with the central wall and an opened condition disengaged from the central wall, the base, the central wall, the first and second wall sections and the transverse wall segments form in the closed condition at least two cells being open at top, a bottom of each cell being provided with an opening, the base comprises a supporting structure at a lower part of the main body, and the main body further comprises a support and an irrigation mat, the support comprising one or more engaging arms that extend from at least one long side of the central wall to hold the irrigation mat in position at a lower portion of the main body towards the base so that the irrigation mat is above the base, and the one or more engaging arms comprise respective mat receiving portions that are above the base.

2. The container according to claim 1, wherein the irrigation mat is suitably arranged at the base of the main body, with one or both ends ending on the outside of the container.

3. The container according to claim 1, wherein the support comprises an aperture in each of the end walls, which is configured to receive the irrigation mat.

4. The container according to claim 1, wherein the wall sections are tapering, continuously, towards the base.

5. The container according to claim 1, wherein the first wall section and the second wall section are hingeably connected to the main body by a hinge.

6. The container according to claim 5, wherein the hinge comprises a pin on each side of the lower part of the first wall section and the second wall section, and through openings at adjacent sides of the end walls for engagement of each of the pins in mating openings.

7. The container according to claim 6, wherein the through openings at the adjacent sides of the end walls have an oblong shape, which openings have a longer diameter in the vertical direction than in the horizontal direction.

8. The container according to claim 1, wherein the wall sections forming the cells have a corrugated inside surface.

9. The container according to claim 8, wherein the container is provided with locking members for secure engagement with the main body in closed condition, the locking members comprises a male-female connection between the central wall and each of the first wall section and the second wall section.

10. An assembly of a tray for plants and a container, the assembly comprising: a sidewall comprising long sides, and short sides; a bottom, an upper side of the tray being open; and a container for propagating growth of seedlings wherein at least at the short sides or the long sides of the tray include apertures, and wherein the container comprising: a main body comprising a base, and a central wall extending vertically from the base, and a first wall section and a second wall section that are arranged to the main body, wherein the first wall section and the second wall section are arranged alongside and spaced apart from respective long sides of the central wall of the main body, the main body has two opposing end walls at respective short sides, the first and second wall sections are provided with transverse wall segments, the first wall section and the second wall section are hingeably connected to the main body for movement between a closed condition in engagement with the central wall and an opened condition disengaged from the central wall, the base, the central wall, the first and second wall sections and the transverse wall segments form in the closed condition at least two cells being open at top, a bottom of each cell being provided with an opening, the main body further comprises a support and an irrigation mat, the support comprising one or more engaging arms that extend from at least one long side of the central wall to hold the irrigation mat in position at a lower portion of the main body towards the base so that the irrigation mat is above the base, and the one or more engaging arms comprise respective mat receiving portions that are above the base.

11. A tray for plants according to claim 10, further comprising: brackets arranged adjacent the bottom for supporting the containers at a distance from the bottom surface.

12. A method for propagating growth of seedlings, comprising:
  filling soil and placing seeds in cells in one or more containers according to claim 1;
  providing the containers with an irrigation mat;
  placing the container or the containers in a tray on brackets such that the irrigation mat or mats are positioned adjacent and towards the bottom surface of the tray;
  adding water into the tray; and
  arranging a transparent cover on top of the tray.

* * * * *

UNITED STATES PATENT AND TRADEMARK OFFICE
CERTIFICATE OF CORRECTION

PATENT NO.         : 9,795,090 B2
APPLICATION NO.    : 14/280394
DATED              : October 24, 2017
INVENTOR(S)        : Torsten Nilsson et al.

It is certified that error appears in the above-identified patent and that said Letters Patent is hereby corrected as shown below:

In the Claims

At Column 9, Line numbers 8, Claim number 11:
Delete "A tray for plants"
And insert therefor -- "The assembly" --

Signed and Sealed this
Second Day of January, 2018

Joseph Matal
*Performing the Functions and Duties of the*
*Under Secretary of Commerce for Intellectual Property and*
*Director of the United States Patent and Trademark Office*